Feb. 25, 1936.  J. Q. HOLMES  2,032,127
TRIMMING APPARATUS
Filed Dec. 2, 1932  10 Sheets-Sheet 2

Inventor
John Q. Holmes
By Spencer Hardman & Fehr
his Attorneys

Feb. 25, 1936.    J. Q. HOLMES    2,032,127
TRIMMING APPARATUS
Filed Dec. 2, 1932    10 Sheets-Sheet 7

Patented Feb. 25, 1936

2,032,127

UNITED STATES PATENT OFFICE 2,032,127

TRIMMING APPARATUS

John Q. Holmes, Anderson, Ind., assignor, by mesne assignments, to General Motors Corporation, Detroit, Mich., a corporation of Delaware Application December 2, 1932, Serial No. 645,362

17 Claims. (Cl. 82—2)

This invention relates to trimming apparatus and more particularly to apparatus for trimming flash from molded articles such as caps for automotive transformers.

It is among the objects of the present invention to provide simultaneously and automatically operating tools for trimming flash from transformer caps.

Another object of the present invention is automatically to index a conveyor carrying transformer caps into operative alignment with the trimming tools.

Another object of the present invention is automatically to eject finished transformer caps from the conveyor so that the services of an operator are required for depositing transformer caps on the conveyor only.

Further objects and advantages of the present invention will be apparent from the following description, reference being had to the accompanying drawings wherein a preferred embodiment of one form of the present invention is clearly shown.

In the drawings:

Fig. 8 is a side elevation of the lower half of the apparatus as defined by and looking in the direction of arrows 8—8 in Fig. 1.

Fig. 14 is a side elevation of the top part of the apparatus looking in the direction of arrow 14 in Fig. 1.

Fig. 18 is a view similar to Fig. 17 showing the ejector in action.

Figure 1:
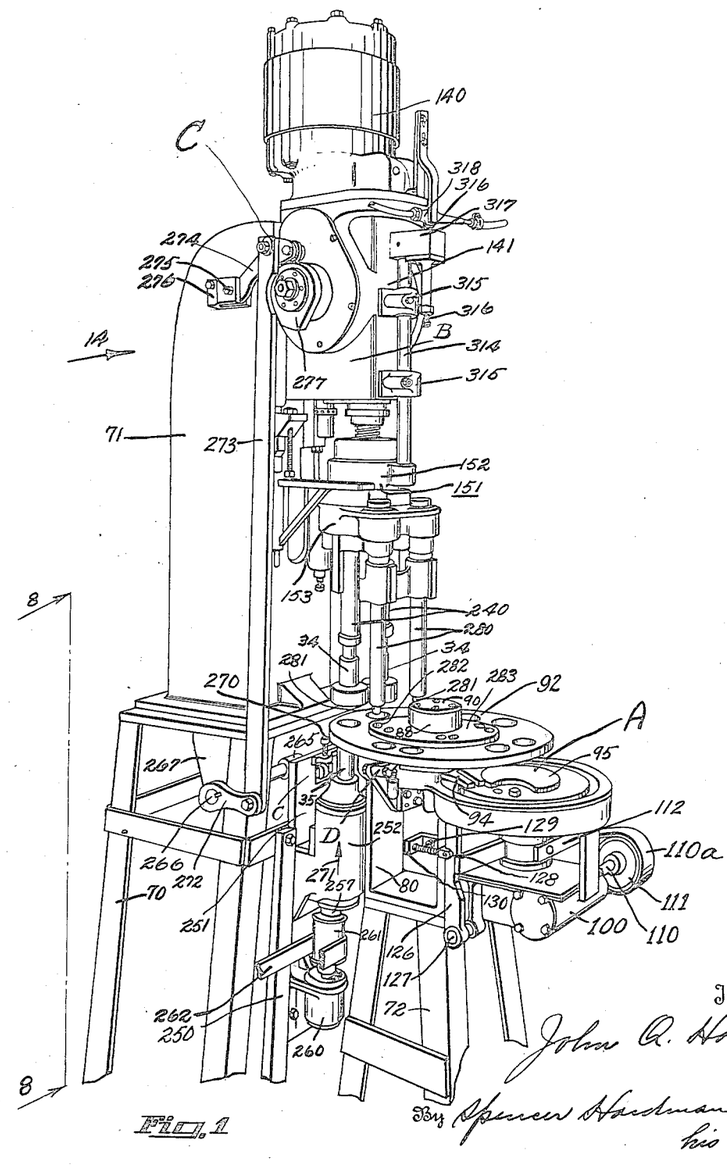
Fig. 1 is a perspective view of an apparatus embodying the present invention.
Figure 2:
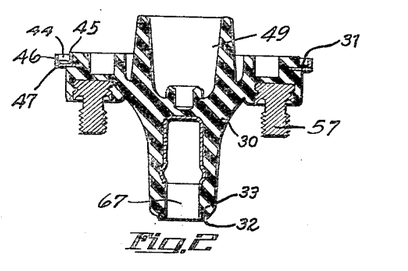
Fig. 2 is a sectional view through a transformer cap before removal of the flash.
Figure 3:
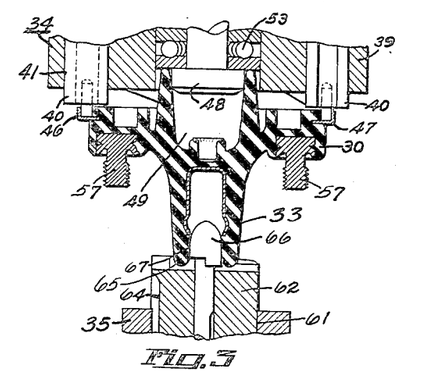
Fig. 3 is a fragmentary sectional view through the transformer cap and the flash removing tools in operative engagement therewith.
Figure 4:
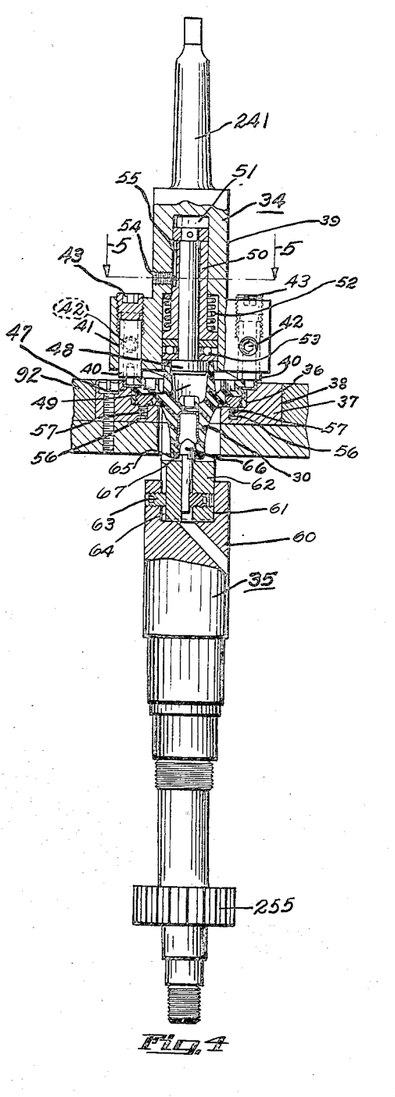
Fig. 4 is a reduced detail view partly in section of the flash removing tools in operative engagement with a properly supported transformer cap.
Figure 5:
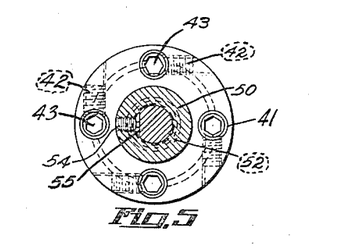
Fig. 5 is a sectional view taken on the line 5—5 of Fig. 4, and showing the arrangement of the flash removing or trimming bits of the upper tool.
Figure 6:
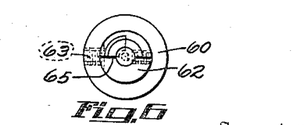
Fig. 6 is a top view of the lower flash removing and shaping tool.

Referring more particularly to Figs. 2 to 4 inclusive, the reference numeral 30 designates a transformer cap which is being operated upon by the present apparatus. This apparatus is adapted to trim flash 31 and 32 and to shape a portion 33 of the transformer cap from the cross-sectional contour disclosed in Fig. 2 to that disclosed in Fig. 3. The apparatus provides a pair of upper trimming tools 34 and a pair of lower trimming tools 35 as can be seen in Fig. 1. Since both upper tools as well as both lower tools are identical in form and operation it is necessary specifically to describe only one set of cooperating tools 34, 35. As shown in Fig. 4 a transformer cap 30 is located in an annular recess 36 of a locating block 37 which itself is located in an annular recess 38 of a conveyor to be described later. The upper tool 34 consists of a tool holder 39 carrying a plurality of trimming bits 40 which as shown in Figs. 4 and 5 are received in concentrically arranged holes 41 of tool holder 39 and longitudinally adjustable therein by means of set screws 42 and 43. These bits 40, upon rotation about the common axis of the tool holder 39 and cap 30 are adapted to remove flash 31 which forms the bottom of an annular groove 44 whose side walls are defined by the cylindrical periphery 45 of the cap and by the cylindrical surface 46 of a metal rim 47 molded into the cap. In order properly to align the bits 40 with the annular groove 44, a pilot 48 is adapted to enter and snugly fit into an aperture 49 of the cap. Pilot 48 is carried by a shell 50 which is longitudinally slidable within a recess 51 of the tool holder and normally urged in one direction by a spring 52. Interposed between shell 50 and pilot 48 is a ball bearing 53 which by means of the spring urged shell 50 is urged into engagement with the cap thereby maintaining the same within locating recess 36 prior to and during the trimming operation. Rotative movement of shell 50 relative to tool holder 39 is prevented and longitudinal movement thereof relative to said tool holder is permitted by means of a set screw 54 in the tool holder which projects into a longitudinal groove 55 of shell 50. Therefore, when tool holder 39 is lowered toward a properly supported cap 30, pilot 48 will first align the annular groove 44 of the cap with trimming bits 40 before the latter enter said groove. Locating block 37 is furthermore provided with two recesses 56 which are adapted to receive screws 57 molded into the cap, thereby preventing the latter from rotating within recess 36. The lower tool 35 comprises a tool holder 60 having an annular recess 61 in which is received a shaping tool 62 which is prevented from rotation relative to tool holder 60 by means of a set screw 63 threaded into said tool holder and engaging a flat portion 64 of said shaping tool. Reference numeral 65 represents the cutting edge of the shaping tool as shown in Fig. 6. In order properly to align the shaping tool with the cap portion 33 to be shaped by said tool, a pilot 66 longitudinally adjustably carried by the shaping tool is adapted to enter a recess 67 of the cap prior to the operative engagement of the shaping tool with said cap portion 33.

Referring particularly to Fig. 1 several supports for various mechanism of the apparatus are shown such as a large table or base 70, a frame 71 supported by said base and a smaller table 72. The various mechanisms carried by the supports are a conveyor and indexing mechanism A, a mechanism B for actuating trimming tools 34, a mechanism C for reciprocating tools 35, work ejecting means D, and control of apparatus.

*Conveyor and indexing mechanism A*

With particular reference to Figs. 1 and 7 to 11 inclusive, a frame 80 is shown mounted in any suitable manner upon table 72. This frame is provided with a boss 81 which serves as support for a non-rotatable stub shaft 82 having an integral collar 83 resting on the top of boss 81. Journaled about the free end of stub shaft 82 is a pair of ball bearings 84 spaced from each other by a tube 85 and maintained in proper position by a nut 86 threaded over the end of said shaft and urging both ball bearings and the spacer toward a shoulder 87 of shaft 82. Journaled about the ball bearings 84 is a cylindrical bracket 88 which rests with its lower surface 89 against collar 83 of shaft 82. A cover plate 90 secured to bracket 88 by screws 91 prevents dust and other undesirable foreign substance from reaching the ball bearings. Press fitted or otherwise secured to the periphery of bracket 88 is a conveyor 92 which as previously stated provides a plurality of annular recesses 38 in which work locating blocks 37 are received. Conveyor 92 and bracket 88 which forms a hub for the conveyor are rotatable in unison about the axis of stub shaft 82, and the locating blocks 37 on the conveyor are located concentric with respect to the axis of said stub shaft. Also secured in any suitable manner to a reduced concentric portion 93 of bracket 88 is a Geneva gear 94 which is in mesh with a Geneva driver 95 keyed at 96 to a stub shaft 97 which is parallel to stub shaft 82 and rotatably supported in bearings 98 and 99 provided by frame 80 and an auxiliary frame 100 respectively, attached in any suitable manner to frame 80. Loosely mounted upon shaft 97 is a worm gear 101 which is keyed as at 102 to a clutch member 103 also loosely mounted on shaft 97 whose face 104 is provided with clutch teeth 105. Splined to shaft 97 as at 106 is a companion clutch member 107 which is longitudinally shiftable into or out of engagement with clutch member 103 by means to be described later. Worm gear 101 is in mesh with a worm 108, keyed at 109 to a shaft 110 properly supported in bearings provided by auxiliary frame 100 and carrying at one end a pulley 111, which through a suitable belt connection 110a is driven from an electric motor 111a (see Fig. 10).

Figures 7, 16, 17:
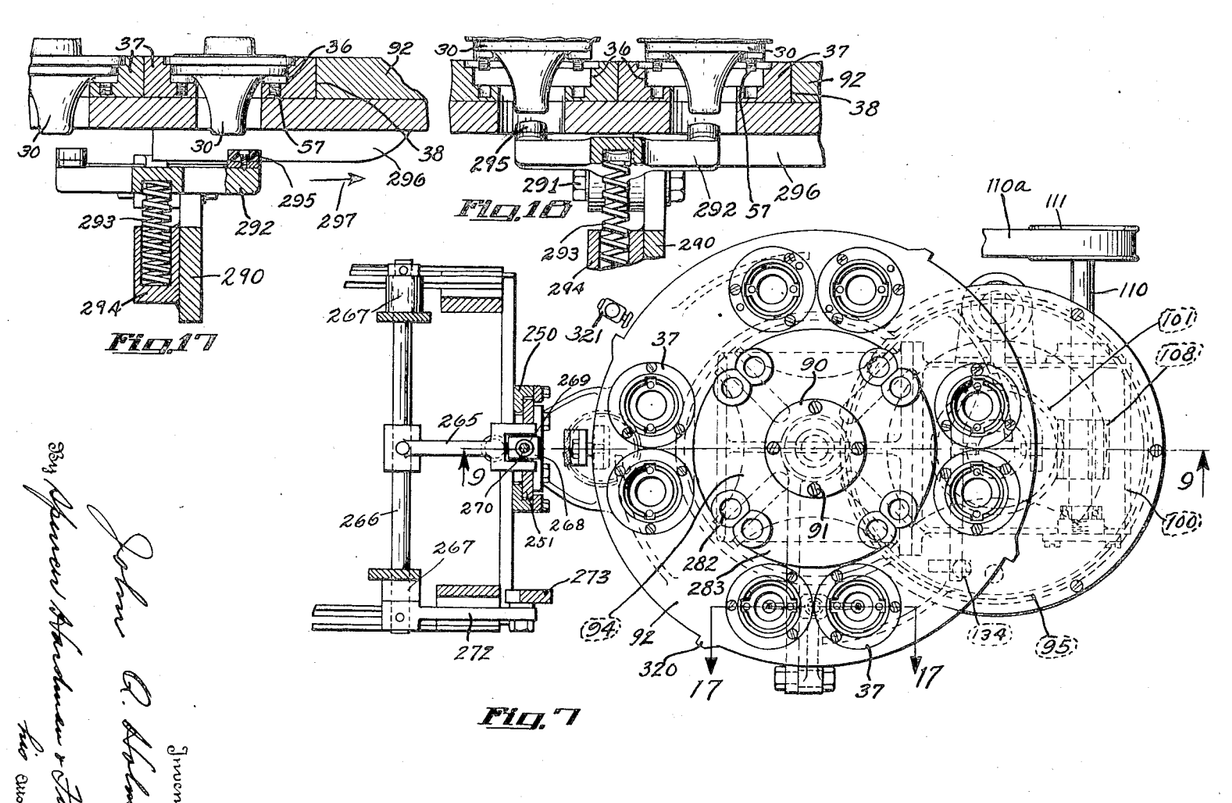
Fig. 7 is a plan view of part of the apparatus with certain parts being shown in section, such section being taken along the line 7—7 of Fig. 8.
Fig. 16 is a sectional view taken along the line 16—16 of Fig. 8.
Fig. 17 is an enlarged fragmentary sectional view taken on the line 17—17 of Fig. 7, disclosing the construction of the automatic ejector.
Figure 9:
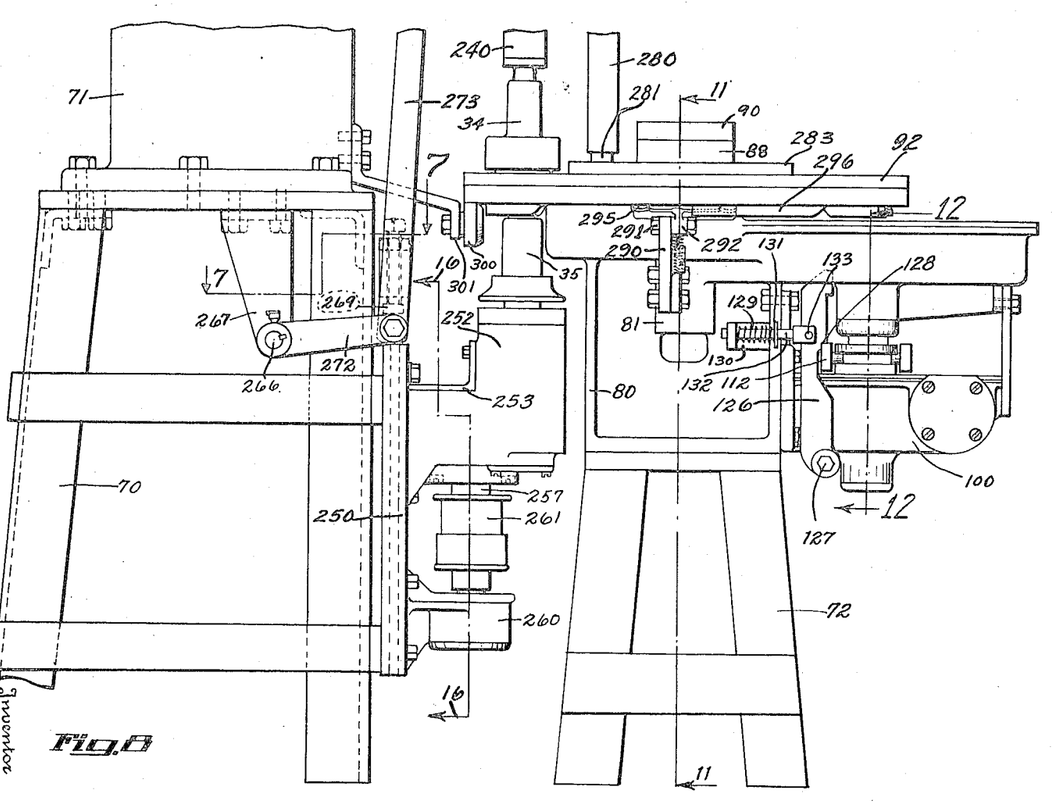
Fig. 9 is a fragmentary sectional view taken on the line 9—9 of Fig. 7.
Figures 9, 10:
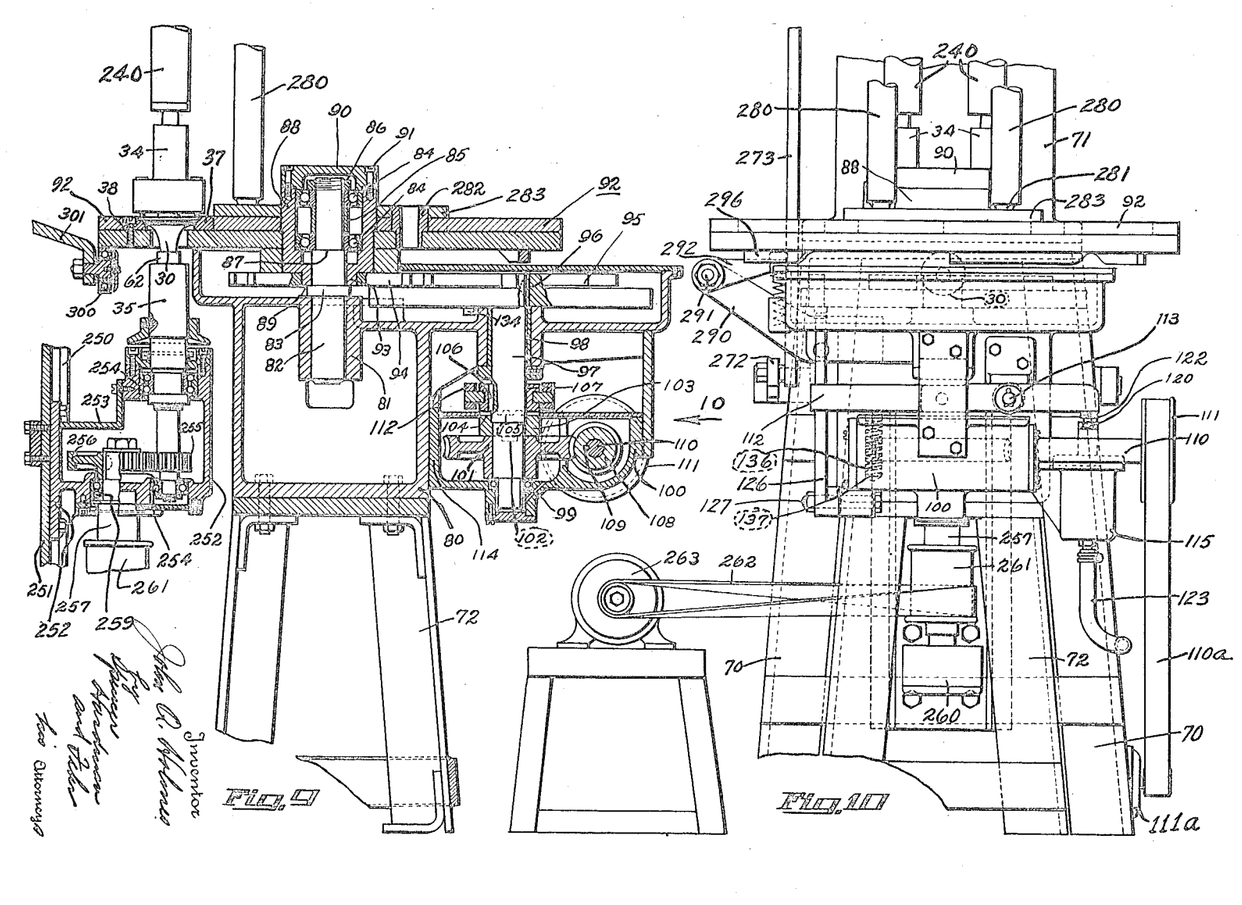
Fig. 10 is a front elevation of the lower half of the apparatus looking in the direction of arrow 10 in Fig. 9.
Figure 11:
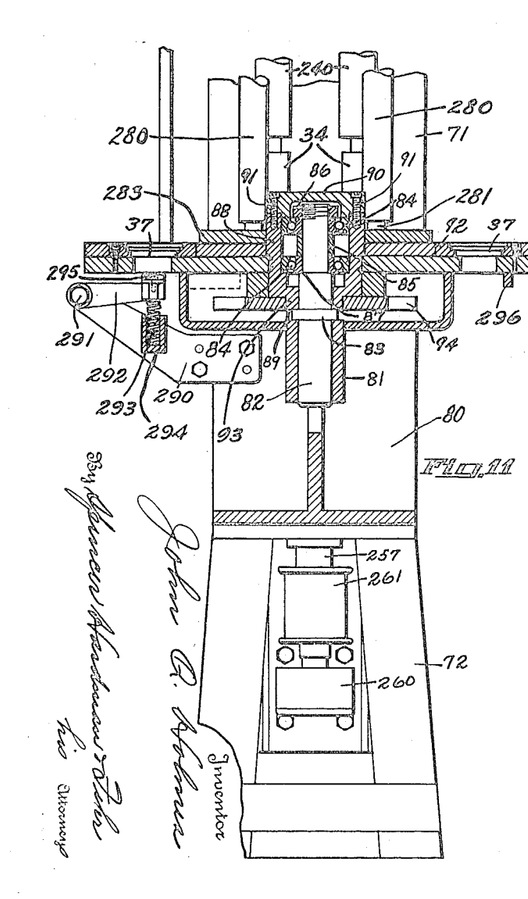
Fig. 11 is a sectional view taken on the line 11—11 of Fig. 8.
Figures 12, 13:
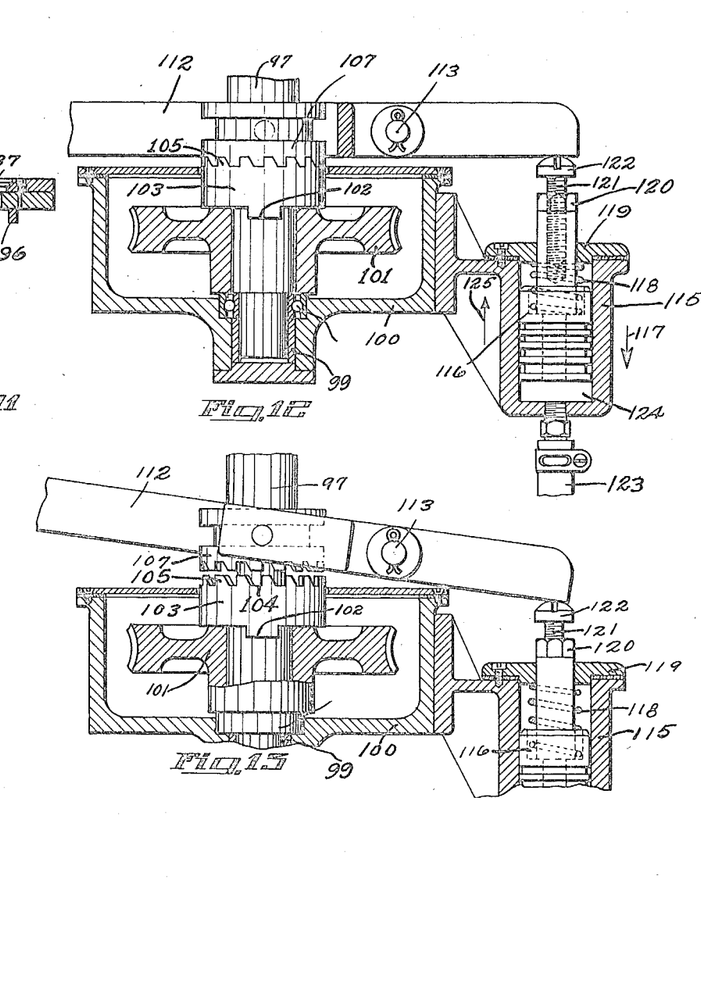
Fig. 12 is an enlarged sectional view taken on the line 12—12 of Fig. 8, showing the indexing clutch in driving engagement.
Fig. 13 is a view similar to Fig. 12 showing, however, the clutch disengaged.
Figures 15, 16:
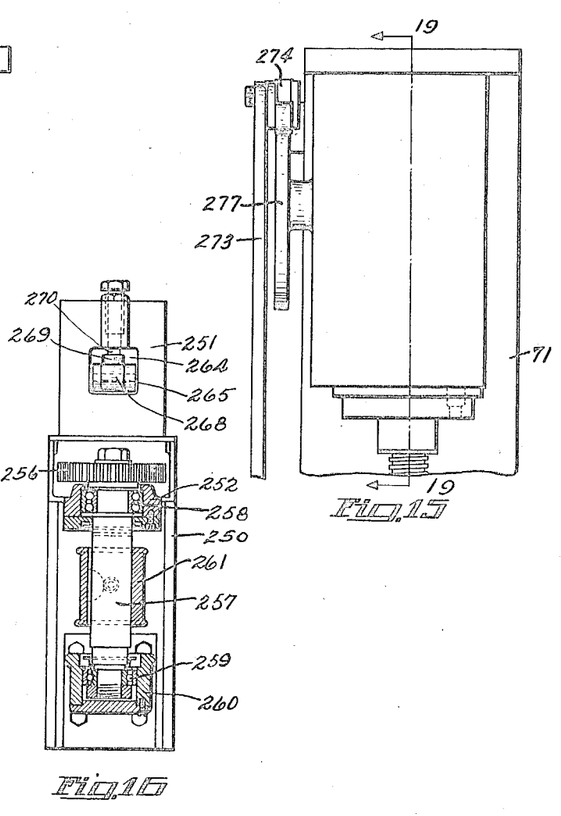
Fig. 15 is a fragmentary front elevational view of the apparatus part disclosed in Fig. 14.
Figure 17:
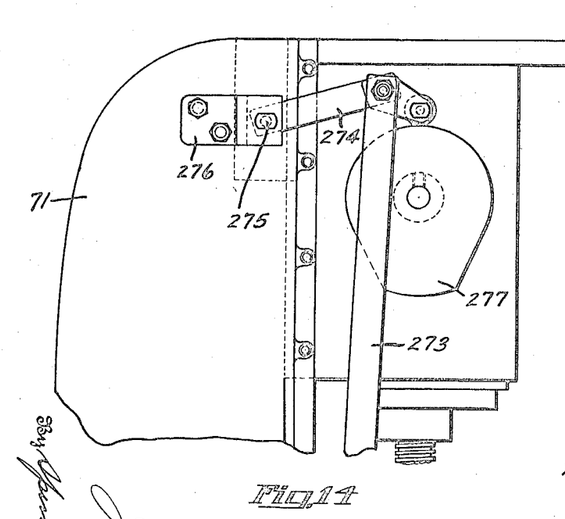
Figure 25:
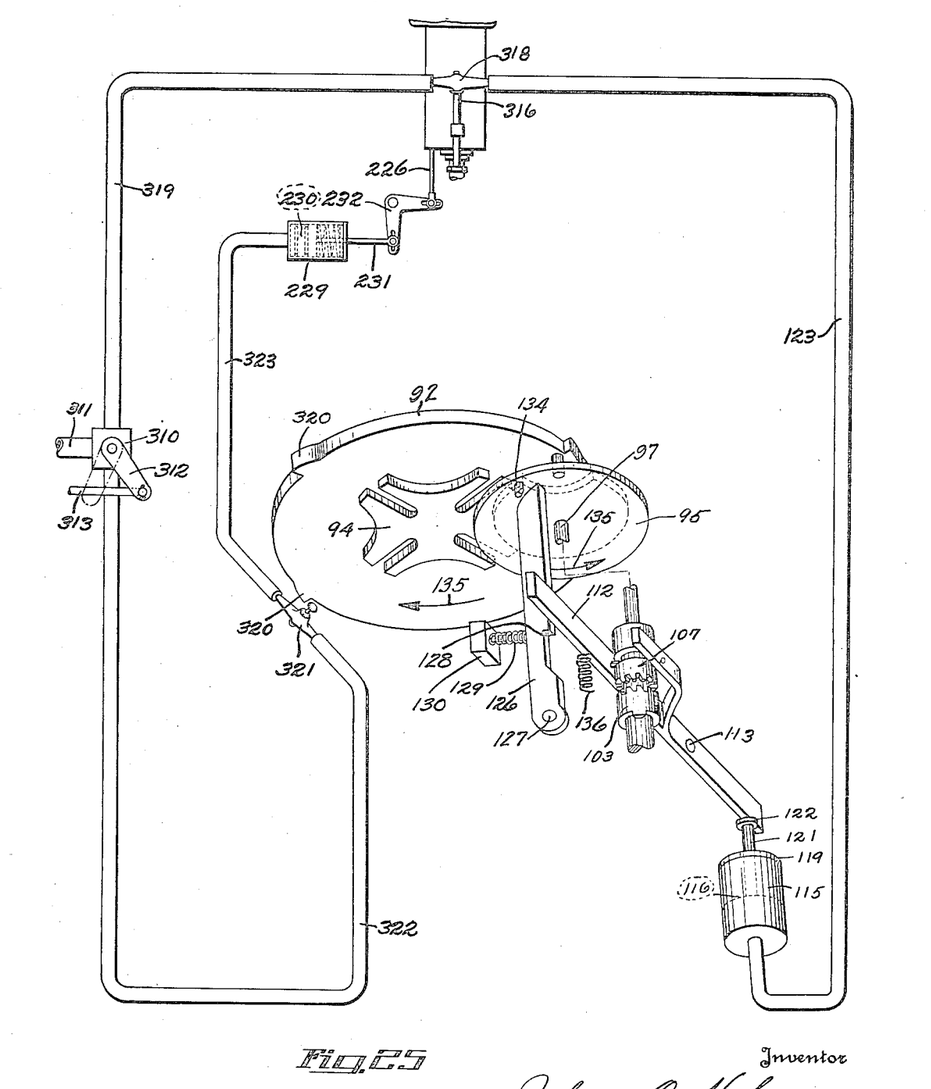
Fig. 25 is a diagrammatic view illustrating the ways and means employed in properly timing the operations of the various mechanisms of the apparatus.

The indexing of conveyor 92 is determined by the engagement or disengagement between clutch members 103 and 107. As best shown in Figs. 9, 12 and 13 a clutch shifter bar 112 is pivotally mounted at 113 to the wall 114 of auxiliary frame 100. Secured in any suitable manner to auxiliary frame 100 is a cylinder 115 containing a piston 116 which is normally urged in the direction of arrow 117 (see Fig. 12) by a spring 118 bearing with one end against said piston and with the other end against a cylinder cover 119. Threaded into piston 116 and locked in adjusted position by a nut 120 is a screw 121 whose head 122 is in vertical alignment with clutch shifter bar 112. A tube or hose connection 123 provides communication at times, to be described, between a source of fluid pressure such as compressed air and the cylinder chamber 124. When fluid pressure is admitted to said chamber 124, piston 116 is moved against the tendency of the spring 118 in the direction of arrow 125, whereupon the screw head 122 rocks clutch shifter bar 112 from the position shown in Fig. 13 to that shown in Fig. 12, whereby clutch member 107 is shifted into driving engagement with clutch member 103. The means for admitting fluid pressure to the cylinder 124 will be described later in connection with the control of the apparatus. Engagement of clutch member 107 with clutch member 103 results in an indexing of conveyor 92 as can be readily understood from the foregoing. In order to stop intermittent rotation of the conveyor 92 after having traveled through a predetermined cycle, clutch member 107 has to be disengaged from clutch member 103 at the proper time. This is accomplished by providing a latch bar 126, pivotally mounted at 127 to auxiliary frame 100, which latch bar has a shoulder 128 preventing clutch shifter bar 112 when in clutch engaging position from moving into clutch disengaging position. Latch bar 126 is urged in a clockwise direction as viewed in Fig. 8 by a compression spring 129 which is interposed between a bracket 130 secured to frame 80 in any suitable manner, and between a collar 131 of a clevis 132, pivotally mounted at 133 to said latch bar and slidable substantially longitudinally through bracket 130. As best shown in Figs. 7, 9 and 25, Geneva driver 95, carries a projecting pin 134 which during one rotation of said Geneva driver in the direction of arrow 135, in Fig. 25, engages and rocks latch bar 126 against the tendency of spring urged clevis 132, whereby shoulder 128 of said latch bar clears clutch shifter bar 112, whereupon the same is rocked clockwise as viewed in Fig. 10 by a compression spring 136 which is located in a recess 137 of auxiliary frame 100. Such movement of clutch shifter rod 112 results in disengagement between clutch members 107 and 103 as can be readily understood from Figs. 12 and 13. It may be stated in advance that at the release of clutch shifter bar 112 from latch bar 126, cylinder chamber 124 does not contain fluid under sufficient pressure to prevent movement of clutch shifter bar 112 into disengaging position by means of compression spring 136. Upon disengagement of clutch member 107 from companion member 103 conveyor 92 comes to rest.

*Mechanism B for actuating trimming tools 34*

Referring more particularly to Figs. 1, and 19 to 24 inclusive, an electric motor 140 is shown mounted in any suitable manner on a casing 141 which houses the mechanism to be described and is vertically adjustably carried by frame 71. A gear 142 mounted on the armature shaft 143 meshes with a gear 144, keyed to a tubular sleeve 145 and held in position by a collar 146 threadedly engaging the end of the tubular sleeve 145 which is journaled in end thrust bearings 147 and 148. A spindle 149 is splined to the tubular sleeve 145, journaled with its lower end in a ball bearing 150 and carries beyond said ball bearing a gear (not shown) which is enclosed in a housing 151 consisting of two halves 152 and 153. Housing 151 is non-rotatably supported in any suitable manner by a quill 154, through which spindle 149 extends. Endwise movement of spindle 149 relative to quill 154 which is slidable longitudinally in an annular recess 155 of casing 141 is prevented by a shoulder 156 integral with spindle 149 and resting against the inner race of ball bearing 150, a nut 157 which is threadedly received by the quill 154 and retains the outer race of said ball bearing in engagement with a shoulder 158 provided by said quill, and a nut 159 which is threaded over spindle 149 and retains shoulder 156 in firm engagement with the inner race of ball bearing 150. From this it may be seen that spindle 149 is rotatable whenever motor 140 is running, and it may also be understood that the spindle 149 continues to rotate even though it moves axially. Quill 154 may move longitudinally relative to casing 141 but is held non-rotatable relative thereto by a key 160. located in the casing 141 and projecting into a longitudinal groove 161 provided by the quill.

Figure 19:
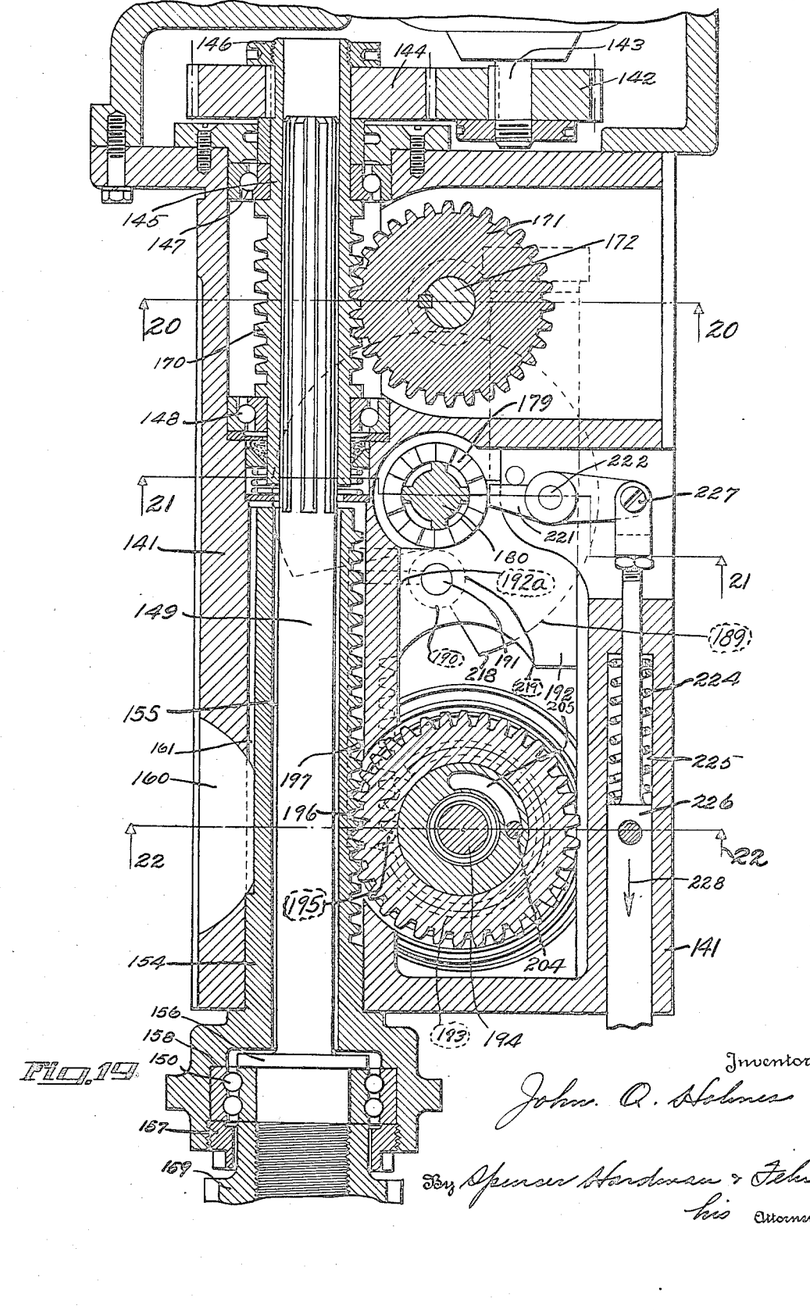
Fig. 19 is an enlarged longitudinal sectional view taken on the line 19—19 of Fig. 15 and showing details of construction of the mechanism for operating the upper tools.
Figure 20:
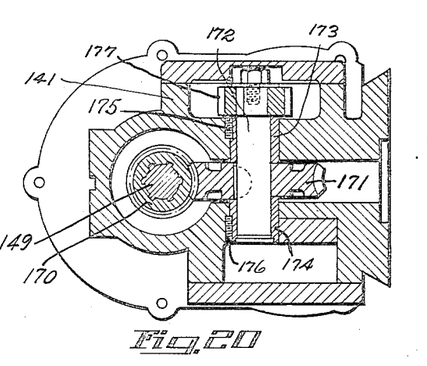
Figs. 20 to 22 inclusive are reduced sectional views taken along the lines 20—20, 21—21 and 22—22 respectively, of Fig. 19.
Figures 21, 24:
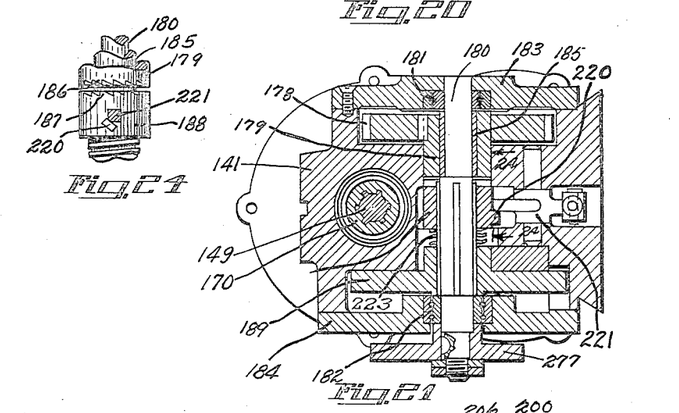
Fig. 24 is a fragmentary sectional view taken on the line 24—24 of Fig. 21.

The tubular sleeve 145 is provided with a worm 170 meshing with a worm gear 171 keyed to a shaft 172 (see also Fig. 20) which is journaled in bearings 173 and 174 supported by the casing 141 and held in position by screws 175 and 176 respectively. Shaft 172 carries a spur gear 177 which meshes with a gear 178 (see Fig. 21), keyed to a tubular member 179 rotatably mounted on a shaft 180 which is journaled in bearings 181 and 182, provided by a gear retaining cap 183 and an end cover 184, respectively, each of which is attached to the casing 141 in any suitable manner. Intermediate the tubular member 179 and shaft 180 is mounted a bushing 185. As best seen in Fig. 24 member 179 terminates in radial teeth 186 which cooperate with corresponding teeth 187 integral with a member 188 splined to shaft 180. Also splined to shaft 180 is a cam disc 189 which cooperates with a cam follower 190, mounted on a pin 191, carried by a rack 192 and held in position by a set screw 191a. As the cam disc 189 rotates counterclockwise as viewed in Fig. 19, the rack 192 will be urged downwardly so as to feed spindle 149 toward the work through a driving connection consisting of a gear member 193 rotatably mounted upon a shaft 194 and meshing with gear teeth 195 of rack 192. Gear member 193 cooperates with a gear member 196 which meshes with rack teeth 197 provided therefor on the quill 154 in order to feed the spindle 149 downwardly as viewed in Fig. 19. Gear member 193 is provided with a frusto-conical external surface 198 which cooperates with a frusto-conical internal surface 199 of gear member 196 so as to permit longitudinal adjustment of quill 154 relative to casing 141. Gear members 193 and 196 are held in frictional engagement by a nut 200 threadedly engaging the end of shaft 194 and by a shoulder 201 provided by a collar 202 integral with the shaft 194. Upon the loosening of the nut 200, gear member 196 is biased from gear member 193 by a helical spring 203 surrounding shaft 194 and located in a recess in gear member 193. Longitudinal adjustment of the quill 154 is limited by a pin 204 carried by gear member 196 which travels in an arcuate slot 205 in gear member 193. As best seen in Fig. 19, gear members 193 and 196 are limited in their relative angular movement by the length of slot 205 within safe limits whereby it is impossible for gear member 196 to demesh from the quill rack 197 at any longitudinal adjustment of the quill. The end of shaft 194 terminates in a square portion 206 which permits the operator to adjust quill 154 without dismantling the machine.

Figure 22:
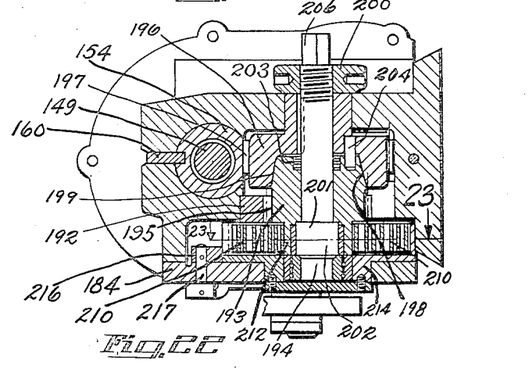
Figure 23:
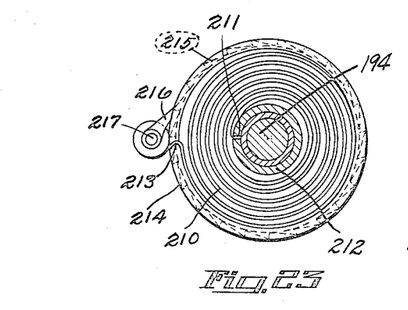
Fig. 23 is a sectional view taken on the line 23—23 of Fig. 22.

The mechanism for retracting quill 154 from the work comprises, as best seen in Figs. 22 and 23, spiral spring 210 which has a hooked end 211 engaging a recess provided therefor in a reduced portion 212 of gear member 193, and a hooked end 213 engaging a recess in a cup-shaped member 214 which is rotatably mounted in end cover 184. In order to adjust the tension of the spring 210, member 214 has been provided with ratchet teeth 215 which cooperate with a pawl 216, mounted on a pin 217 which is carried by end cover 184. The spring 210 which has been even more compressed during the downward movement of quill 154, urges the latter away from the work and the cam follower 190 upwardly as viewed in Fig. 19 when the latter has passed the concentric portion 218 of the cam 198 during its counterclockwise rotation and is free to move into the depression 219 of said cam.

A device has been provided to stop the mechanism from reciprocating quill 154 again after the latter has been retracted into the position shown in Fig. 19. This stopping device consists of a cam projection 220 integral with member 188, which engages a releasing lever 221 mounted on a pivot 222 carried by the casing 141. In Figs. 19, 21 and 24 it may be seen that as the cam projection 220 strikes the lever 221, member 188 will be biased against the force of a helical spring 223 so as to disengage the radial teeth 186 and 187, whereby member 179 will rotate without driving member 188 and the parts driven thereby. In order to reciprocate quill 154 it is necessary to rock lever 221 counterclockwise as viewed in Fig.

19 whereupon member 188 is free to engage member 179. Normally lever 221 is maintained in the position shown in Fig. 19 by a compression spring 224 located in a recess 225 of casing 141 and urging a rod 226 which is pivoted at 227 to lever 221 in the direction of arrow 228 in Fig. 19. As shown in Fig. 25 a stationary cylinder 229 is provided containing a piston 230 whose piston rod 231 is floatingly pivoted to a rotatably mounted bell crank lever 232. Also floatingly pivoted to lever 232 is the rod 226. Upon admission of fluid pressure to cylinder 229, piston 230 is urged toward the right as viewed in Fig. 25 whereby lever 232 is rocked counterclockwise as viewed in Fig. 25 and rod 226 is moved against the tendency of spring 224. This causes lever 221 to rock counterclockwise and release clutch member 188 whereupon the same engages companion member 179, and thus starts a reciprocation of quill 154. Fluid pressure is shut off from cylinder 229 before the clutch members 188 and 179 complete one revolution as will be more fully described later. Therefore, lever 221 is returned into the obstructing position shown in Fig. 19 by spring 224 before the cam lug 220 completes one revolution and upon engagement with said cam lug at the end of one revolution shifts member 188 out of driving engagement with companion member 179.

In order to transmit the rotation and reciprocation of spindle 149 to the trimming tools 34 two shafts 240 are rotatably but axially immovably mounted in any suitable manner in housing 151. The ends of the shafts 240 projecting into said housing carry gears (not shown) which are in mesh with the already described gear carried by the spindle 149 and located in housing 151. The shanks 241 of the tool holders 39 are received by said shafts 240.

Mechanism C for reciprocating tools 35

Referring more particularly to Figs. 1, 7 to 10 inclusive and 14 to 16 inclusive, base 70 provides guide ways 250 for guiding a support plate 251 for vertical movement. Mounted in any suitable manner on said support plate is a casing 252 which is closed by a cover 253. Journaled in ball bearings 254 provided by casing 252 but axially immovable relative thereto are two parallel tool holders 60 which are in axial alignment with tools 34. The lower end of each tool holder 60 carries a gear 255 which is in mesh with a gear 256 carried by a vertical stub shaft 257 rotatably but axially immovably supported by bearings 258 and 259 (see Fig. 16) provided by casing 252 and a bearing bracket 260 respectively, which is also mounted on supporting plate 251. Intermediate its bearings, shaft 257 carries a pulley 261 which is continuously driven by a suitable belt connection 262 from a stationary electric motor 263. In this manner the tools 62 are continuously rotated, and in order to reciprocate the same toward and away from the work, plate 251 with all the structure supported thereon is reciprocated in the guide ways 250 by mechanism to be described presently. As shown in Fig. 16 plate 251 is apertured at 264 and receives therein the forked end of a lever 265 mounted on a shaft 266 which as clearly shown in Figs. 1 and 7 is rotatably supported in bearing bracket 267 suspended from base 70. Pivotally mounted on and located in the fork of lever 265 is an antifriction roller 268 against which bears the head 269 of a screw 270, adjustably secured to supporting plate 251. The entire weight of the supporting plate 251 and the structure thereon is transmitted through the head of screw 270 to the roller 268 as can be readily understood. Rocking of shaft 266 in counterclockwise direction as viewed in Fig. 1 causes movement of supporting plate 251 in the direction of arrow 271 in Fig. 1 whereby the tools 35 are moved toward the work. Such rocking of shaft 266 is accomplished by providing said shaft with a lever 272 which through a link 273 is connected with a cam follower 274 pivotally mounted at 275 to a bracket 276 which is attached in any suitable manner to frame 71. Cam follower 274 cooperates with a disc cam 277 which, as best shown in Fig. 21 is keyed to shaft 180. The action of cam 277 is so timed that simultaneously with the engagement of the tools 34 with the work, the tools 35 engage the work also. The descent of the tools 62 is by gravity but is controlled by cam 277 as can be well understood from the foregoing description. The reciprocating movement of the shaft 257 does not interrupt its continuous rotation because the belt connection 262 yields sufficiently without slipping.

In order properly to align the work with all tools prior to its final alignment by the pilots of the tools, casing 151 carries two pilot bars 280 whose reduced ends 281 are adapted to project into a pair of a plurality of suitable bushing 282 in a plate 283 concentrically mounted on conveyor 92 as best disclosed in Figs. 1 and 9. Plate 283 is so located on conveyor 92 that when the reduced ends of pilot bars 280 register with a pair of aligned bushings 282, all tools are in substantial alignment with the work.

Work ejecting mechanism D

Referring more particularly to Figs. 7, 11, 17 and 18 a bracket 290 is mounted in any suitable manner on frame 80. Pivoted at 291 to bracket 290 is a T-lever 292 which is constantly urged toward conveyor 92 by a compression spring 293 located in a boss 294 of bracket 290. T-lever 292 is provided with non-metallic pads 295 in order to prevent damage to the work when catapulted from the conveyor in a manner to be described presently. Spring 293 is of such strength that the weight of T-lever 292 compresses said spring sufficiently so that the pads 295 clear the conveyor. When T-lever 292 is, however, rocked clockwise as viewed in Fig. 11 by one of a plurality of cams 296 carried by the conveyor 92, spring 293 is appreciably compressed and upon sudden release of the lever 292 from said passing cam, the spring expands and throws T-lever 292 in a counterclockwise direction as viewed in Fig. 11 whereupon the work previously finished is catapulted from the conveyor by the pads 295 in a manner illustrated in Figs. 17 and 18 in which figures the conveyor moves in the direction of arrow 297. The number of cams 296 is naturally the same as the number of pairs of workpieces or transformer caps that can be deposited on the conveyor at one time.

Referring to Fig. 9 an unloading means is provided in the form of a ball bearing 300 engaging the bottom surface of conveyor 92 and supported by a bracket arm 301 mounted in any suitable manner on frame 71. This ball bearing unloads the conveyor shaft 82 from eccentric stresses caused by the yielding ball bearings 84 which by pressure exertion maintain the work in the locating blocks 37 of the conveyor.

Control of apparatus

While describing the control of the apparatus it is deemed proper to describe in a logical connection therewith its mode of operation. Relying during the following description principally on Fig. 25 but not exclusively, a main shut-off valve 310 is shown which communicates through a pipe or hose connection 311 with a source of any suitable fluid pressure (not shown). Valve 310 is controlled by a lever 312 which may be rocked by an operator from the full line position in Fig. 25 to the dot-and-dash position thereof and vice versa. Fig. 25 discloses the relative positions between various mechanisms of the apparatus while at rest, i. e. when main shut-off valve 310 is closed. In order to start the machine, the operator manipulates a handle 313, causing lever 312 to shift into the dot-and-dash position in which to open said valve 310. Since the trimming tools are all in most retracted position in the assumed condition of the apparatus, a bar 314 carried by housing 151 and guided for vertical movement, through bearings 315 on casing 141 is in an uppermost position, in which position of said bar an adjustable screw 316 carried by a block 317, in turn carried by bar 314, maintains a Powell blow-gun 318 open. Fluid pressure is therefore admitted from the source through main shut-off valve 310, through a suitable connection 319, through Powell blow-gun 318, and through the pipe or hose connection 123 to the cylinder chamber 124 (see Fig. 12) whereupon clutch member 107 drivingly engages companion member 103 and the conveyor starts to rotate. Upon the completed shifting of clutch member 107, clutch shifter bar 112 is arrested in clutch engaging position by latch bar 126. In order to index the conveyor, Geneva driver 95 revolves once and before completing one revolution and shortly before the conveyor completes the intermittent rotation, one of a plurality of cam lugs 320 on the periphery of the conveyor opens another stationary Powell blow-gun 321 which then provides communication between cylinder 229 and the source of fluid pressure through main shut-off valve 310, a suitable connection 322 and another suitable connection 323. Admission of fluid pressure into cylinder 229 results in a tripping of bar 226 against the tendency of spring 224 whereupon all continuously rotating tools commence to reciprocate once in a manner previously described. Immediately after the cam lug 320 passes Powell blow-gun 321, the mentioned communication is intercepted by the self-closing Powell blow gun 321 and the bar 226 is returned by spring 224 into the position shown in Figs. 25 and 19, the remaining fluid pressure in connection 323 and cylinder 229 leaks sufficiently so that the rapidly dropping pressure of said remaining fluid does not successfully counteract the tendency of the spring 224. After the bar 226 has been tripped and before the pilot bars 280 register with the locating bushings 282 on the conveyor, the Geneva driver 95 completes one revolution, and shortly before completion of one revolution, the pin 134 on said driver 95 rocks latch bar 126 against the tendency of spring 129 and unlatches clutch shifter bar 112 which is urged into clutch disengaging position by spring 136. Upon return of the tools into most retracted position, the adjustable screw 316 again opens Powell blow-gun 318 to start another indexing of the conveyor and subsequent reciprocation of the tools. If however, the operator at any time before the return of the tools into most retracted position closes the main shut-off valve, no new indexing of the conveyor and reciprocation of the tools takes place as can be easily understood from Fig. 25. As appears from Figs. 1, 17 and 18 the work ejection takes place at the moment the conveyor stops after an intermittent rotation, thereby giving the T-lever ample time to swing into balance after the catapulting of a pair of transformer caps from the conveyor.

While the form of embodiment of the present invention as herein disclosed, constitutes a preferred form, it is to be understood that other forms might be adopted, all coming within the scope of the claims which follow.

What is claimed is as follows:

1. Apparatus for trimming flash from articles having a recess concentrically of the flash comprising, in combination, a workholder for non-rotatably supporting an article; a rotating tool for trimming flash from the article; spring urged means carried by said tool for retaining the article in the workholder and for properly aligning the article with the tool, said means including a member which is not rotated when engaging and retaining the article in the workholders and a pilot rotatable with said tool and registering with the recess of the article; and means for causing relative bodily movement between the tool and the article for the performance of a trimming operation.

2. Apparatus for trimming flash from articles comprising, in combination, a rotary conveyor for non-rotatably supporting articles; a reciprocable tool for trimming flash from an aligned article at a certain station of the conveyor; means for indexing the conveyor so as to align successive articles with the tool; and a spring urged member located at another station of the conveyor for catapulting a finished article from the conveyor.

3. Apparatus for trimming flash from articles comprising, in combination, a rotary conveyor for non-rotatably supporting articles; a reciprocable tool for trimming flash from an aligned article at a certain station of the conveyor; means for indexing the conveyor so as to align successive articles with the tool; and a spring urged member actuated in response to an intermittent rotation of the conveyor for catapulting a finished article from the conveyor.

4. Apparatus for trimming flash from articles comprising, in combination, a rotary conveyor for non-rotatably supporting articles; a reciprocable tool for trimming flash from an aligned article; means for indexing the conveyor so as to align successive articles with the tool; a pivotally mounted spring urged member for catapulting a finished article from the conveyor; and cams carried by the conveyor for actuating the member.

5. Apparatus for trimming flash from articles comprising, in combination, a rotary conveyor disc having a plurality of article receiving apertures for non-rotatably supporting articles; a reciprocable tool for trimming flash from an aligned article; means for indexing the conveyor so as to align successive articles with the tool; a pivotally mounted member having a projecting portion for catapulting a finished article from the conveyor; a spring urging the member toward the conveyor but normally keeping said member out of the path of movement of the articles on the conveyor; and cams on the conveyor for depressing the member against the tendency of the spring and then for suddenly releasing the depressed member whereupon the same is catapulted by the compressed spring so that the projection of said member enters an aperture of the conveyor and strikes against a supported finished article thereby catapulting the latter from the conveyor.

6. Apparatus for trimming flash from articles having a recess concentrically of the flash comprising, in combination, a workholder for non-rotatably supporting an article; a rotating tool for trimming flash from the article; a sleeve carried by said tool and rotatable therewith; a pilot carried by said sleeve and having a head adapted to register with the recess of the article for properly aligning said article with the tool; an anti-friction bearing interposed between the sleeve and the pilot head and adapted to engage and retain the article in the workholder; and means for causing relative bodily movement between the article and the tool for the performance of a trimming operation.

7. Apparatus for trimming flash from articles having a recess concentrically of the flash comprising, in combination, a workholder for non-rotatably supporting an article; a rotating tool for trimming flash from the article; a sleeve carried by said tool for rotation with the latter and longitudinal movement relative to the latter; a stop carried by the tool; a spring urging the sleeve toward said stop; a pilot carried by said sleeve and having a head adapted to register with the recess of the article for properly aligning said article with the tool; an anti-friction bearing interposed between the sleeve and the pilot head and adapted to engage and retain the article in the workholder; and means for causing relative bodily movement between the article and the tool for the performance of a trimming operation.

8. Apparatus for trimming flash from articles comprising, in combination, a rotary conveyor for non-rotatably supporting articles; a reciprocable tool for trimming flash from an aligned article; means for indexing the conveyor so as to align successive articles with the tool; power means for operating the indexing means; a normally disconnected clutch for drivingly connecting the power means with the indexing means; a cylinder and a piston therein for drivingly connecting the clutch; a normally closed valve for connecting the cylinder with a supply of fluid pressure, said valve being opened by the tool during the latter part of its withdrawal from an article; and means latching the clutch in connected position, said means being actuated so as to release the clutch in response to operation of the indexing means.

9. Apparatus for trimming flash from articles comprising, in combination, a rotary conveyor for non-rotatably supporting articles; a reciprocable tool for trimming flash from an aligned article; Geneva gears for indexing the conveyor so as to align successive articles with the tool; power means for driving the Geneva driver; a normally disconnected clutch for drivingly connecting the power means with the Geneva driver; a cylinder and a piston therein for drivingly connecting the clutch; a normally closed valve for connecting the cylinder with a supply of fluid pressure, said valve being opened by the tool during the latter part of its withdrawal from an article; and a spring urged latch retaining the clutch in connected position.

10. Apparatus for trimming flash from articles comprising, in combination, a rotary conveyor for non-rotatably supporting articles; a reciprocable tool for trimming flash from an aligned article; Geneva gears for indexing the conveyor so as to align successive articles with the tool; power means for driving the Geneva driver; a normally disconnected clutch for drivingly connecting the power means with the Geneva driver; a cylinder and a piston therein for drivingly connecting the clutch; a normally closed valve for connecting the cylinder with a supply of fluid pressure, said valve being opened by the tool during the latter part of its withdrawal from an article; a spring urged latch retaining the clutch in connected position; and a pin carried by the Geneva driver and adapted to withdraw the latch from the drivingly connected clutch when passing the former.

11. Apparatus for trimming flash from articles comprising, in combination, a rotary conveyor for non-rotatably supporting articles; a reciprocable tool for trimming flash from an aligned article; means for indexing the conveyor so as to align successive articles with the tool; power means for operating the indexing means; a normally disconnected clutch for drivingly connecting the power means with the indexing means; means actuated in response to a reciprocation of the tools for drivingly connecting the clutch; means retaining the clutch in connected position; and means carried by the indexing means for causing the retaining means to release the connected clutch.

12. Apparatus for trimming flash from articles comprising, in combination, a rotary conveyor for non-rotatably supporting articles; a reciprocable tool for trimming flash from an aligned article; indexing means for intermittently rotating the conveyor so as to align successive articles with the tool; power means for operating the indexing means; a normally disconnected clutch for drivingly connecting the power means with the indexing means; a cylinder and a piston therein for drivingly connecting the clutch; a normally closed valve for connecting the cylinder with a supply of fluid pressure, said valve being opened by the tool during the latter part of its withdrawal from an article; means retaining the clutch in connected position, said means releasing the clutch in response to operation of the indexing means; a mechanism for reciprocating the tool; means including a cylinder and a piston therein for rendering said mechanism effective; a normally closed valve connecting the last mentioned cylinder with a supply of fluid pressure; and cam lugs on the conveyor for opening said last mentioned valve when passing the same.

13. Apparatus for trimming flash from articles comprising, in combination, a rotary conveyor for non-rotatably supporting articles; a reciprocable tool for trimming flash from an aligned article; means for indexing the conveyor so as to align successive articles with the tool; power means for operating the indexing means; a normally disconnected clutch for drivingly connecting the power means with the indexing means; a cylinder and a piston therein for drivingly connecting the clutch; a manually operable shut-off valve communicating with a source of fluid pressure and having two branch conduits; a normally closed valve for connecting the cylinder with one of the branch conduits, said valve being opened by the tool during the latter part of its withdrawal from an article; means retaining the clutch in connected position, said means releasing the clutch in response to operation of the indexing means; a mechanism for reciprocating the tool; means including a cylinder and a piston therein for rendering said mechanism effective; and a normally closed valve connecting the last mentioned cylinder with the other branch conduit, said valve being opened in response to intermittent rotation of the conveyor through a completed predetermined cycle.

14. Apparatus for trimming flash from articles comprising, in combination, a rotary conveyor for non-rotatably supporting articles; a plurality of reciprocable tools for simultaneously trimming flash from a group of aligned articles at a certain station of the conveyor; means for indexing the conveyor so as to align successive groups of articles with the tools; and a single spring urged member located at another station of the conveyor for simultaneously catapulting a group of finished articles from the conveyor.

15. Apparatus for trimming flash from articles comprising. in combination, a rotary conveyor for non-rotatably supporting articles; a plurality of reciprocable tools for simultaneously trimming flash from a group of aligned articles at a certain station of the conveyor; means for indexing the conveyor so as to align successive groups of articles with the tools; and a single spring urged member actuated in response to an intermittent rotation of the conveyor for simultaneously catapulting a group of finished articles from the conveyor.

16. Apparatus for trimming flash from articles comprising, in combination, a rotary conveyor for non-rotatably supporting articles; a plurality of reciprocable tools for simultaneously trimming flash from a group of aligned articles at a certain station of the conveyor; means for indexing the conveyor so as to align successive groups of articles with the tools; a single spring urged member for simultaneously catapulting a group of finished articles from the conveyor; and cams carried by the conveyor for actuating said member.

17. Apparatus for trimming flash from articles comprising, in combination, a rotary conveyor disc having a plurality of article receiving apertures for non-rotatably supporting articles; a plurality of reciprocable tools for simultaneously trimming flash from a group of aligned articles; means for indexing the conveyor so as to align successive groups of articles with the tools; a single pivotally mounted member having a plurality of projecting portions; a spring urging the member toward the conveyor but normally keeping said member out of the path of movement of the articles on the conveyor; and cams on the conveyor for depressing the member against the tendency of the spring and then for suddenly releasing the depressed member whereupon the same is catapulted by the compressed spring so that the projections of said member enter apertures of the conveyor and strike against a group of finished articles therein thereby catapulting the latter from the conveyor.

JOHN Q. HOLMES.